United States Patent
Minchew et al.

(10) Patent No.: US 8,467,090 B2
(45) Date of Patent: Jun. 18, 2013

(54) COLOR SELECTION APPARATUS AND METHOD FOR PRODUCING LOW METAMERIC COLOR MERCHANDISE

(75) Inventors: Carl Minchew, Mountain Lakes, NJ (US); Bobby Chin, Sparta, NJ (US); Edmund N. Colosi, Toms River, NJ (US)

(73) Assignee: Columbia Insurance Company, Omaha, NE (US)

( * ) Notice: Subject to any disclaimer, the term of this patent is extended or adjusted under 35 U.S.C. 154(b) by 969 days.

(21) Appl. No.: 12/380,745

(22) Filed: Mar. 3, 2009

(65) Prior Publication Data

US 2010/0225935 A1    Sep. 9, 2010

(51) Int. Cl.
*G06F 15/00* (2006.01)
*G09G 5/02* (2006.01)

(52) U.S. Cl.
USPC .............................. 358/1.9; 345/593; 345/594

(58) Field of Classification Search
None
See application file for complete search history.

(56) References Cited

U.S. PATENT DOCUMENTS

| | | | |
|---|---|---|---|
| 3,601,589 A * | 8/1971 | McCarty ........................ 382/165 |
| 4,329,710 A | 5/1982 | Taylor |
| 5,483,360 A | 1/1996 | Rolleston et al. |
| 5,798,943 A * | 8/1998 | Cook et al. .................... 382/162 |
| 5,929,906 A | 7/1999 | Arai et al. |
| 6,330,342 B1 | 12/2001 | Winter et al. |
| 6,698,860 B2 | 3/2004 | Berns et al. |
| 6,843,840 B2 | 1/2005 | Kataoka et al. |
| 6,849,110 B2 | 2/2005 | Sano |
| 6,987,567 B2 | 1/2006 | Takahashi et al. |
| 7,019,868 B2 | 3/2006 | Chang et al. |
| 7,053,910 B2 | 5/2006 | Newman |
| 7,505,044 B2 * | 3/2009 | Bowsher et al. .............. 345/594 |
| 7,583,420 B2 * | 9/2009 | Namikata ...................... 358/518 |
| 7,787,142 B2 * | 8/2010 | Pogue et al. .................. 358/1.16 |
| 2003/0144377 A1 | 7/2003 | Sano et al. |
| 2005/0068550 A1 * | 3/2005 | Braun ............................. 358/1.9 |
| 2005/0094169 A1 * | 5/2005 | Berns et al. .................... 358/1.9 |
| 2005/0094871 A1 | 5/2005 | Berns et al. |
| 2005/0146531 A1 * | 7/2005 | Rice et al. ...................... 345/593 |
| 2006/0181707 A1 | 8/2006 | Gibson et al. |
| 2007/0263098 A1 | 11/2007 | Quan et al. |
| 2007/0263265 A1 | 11/2007 | Sekine |
| 2008/0017066 A1 * | 1/2008 | Bauer et al. ................... 106/31.6 |
| 2008/0259600 A1 * | 10/2008 | Pohlert et al. .................. 362/235 |
| 2009/0019086 A1 * | 1/2009 | Prakash et al. ............. 707/104.1 |

(Continued)

FOREIGN PATENT DOCUMENTS

| | | |
|---|---|---|
| DE | 102006061286 A1 | 8/2007 |
| GB | 2093214 A | 8/1982 |
| GB | 2371729 A * | 7/2002 |

OTHER PUBLICATIONS

Richard L. Alfin, Mark D. Fairchild Observer Variability in Metameric Color Matches using Color Reproduction Media 1996 Munsell Color Science Library, Center for Imaging Science, Rochester Institute of Technology pp. 174-188.*

(Continued)

*Primary Examiner* — Barbara Reinier
(74) *Attorney, Agent, or Firm* — The H.T. Than Law Group

(57) ABSTRACT

A methodology and apparatus provide the customers and other decision makers the ability to make decisions, such as purchase decisions and other selections, based solely on non-verbal and non-textual, non-symbolic or non-hieroglyphic prints on a substrate.

31 Claims, 10 Drawing Sheets
(6 of 10 Drawing Sheet(s) Filed in Color)

U.S. PATENT DOCUMENTS

2010/0014107 A1* 1/2010 Hoshii et al. ............... 358/1.9
2011/0310415 A1* 12/2011 Mahy et al. ............... 358/1.9

OTHER PUBLICATIONS

European Search Report issued in connection with corresponding EP Application No. 10004713.3 on Oct. 1, 2010.

Imai et al., "Comparative Study of Metrics for Spectral Match Quality." CGIV 2002: The First European Conference on Colour Graphics, Imaging, and Vision. pp. 492-496.

Berns, Billmeyer and Saltzman's Principles of Color Technology, 3rd Edition, John Wiley and Sons, 2000. pp. 56-59, 107, and 124-128.

Taplin and Berns, "Spectral Color Reproduction Based on a Six-Color Inkjet Output System." IS&T/SID Ninth Color Imaging Conference. pp. 209-213, Nov. 2001.

Wyble and Berns, "A Critical Review of Spectral Models Applied to Binary Color Printing." Color Research and Application, vol. 25, No. 1, Feb. 2000. pp. 4-19.

International Color Consortium. Summary of CIE Publication 163: 'The effects of flourescence in the characterization of imaging media.', Apr. 2005.

Tzeng and Berns, "Spectral-Based Six-Color Separation Minimizing Metamerism." IS&T/SID Eighth Color Imaging Conference. pp. 342-347, copyright 2000, IS&T.

"Color Palette." The Free Dictionary. http://encyclopedia2.thefreedictionary.com/color%20palette>color paletts</a>. Retrieved Mar. 2, 2009.

Calibrated Lookup Tables for Pantone Licensed Printer Brother HL-4200 CN. http://www.pantone.de/pages/calibratedprinters/calibratedprinters.aspx. Retrieved Mar. 2, 2009.

Balaji S.R., et al. "Hierarchical Compression of Color Look Up Tables." 15th Color Imaging Conference Final Program and Proceedings. pp. 261-266, 2007.

* cited by examiner

COLOR SELECTION APPARATUS AND METHOD FOR PRODUCING LOW METAMERIC COLOR MERCHANDISE

FIELD OF THE INVENTION

This invention generally relates to an apparatus for providing customers with color samples, e.g., color chips, wet paint samples and/or color merchandise depicting accurate colors and accurate paint colors.

BACKGROUND OF THE INVENTION

Before purchasing paints, buyers typically are given a fan deck or palette comprising hundreds or thousands of paint chips, which represent a small portion of the available paint colors. The paint chips typically measure about 1¼ inch by 2 inches, and recently, buyers can purchase larger paint chips of about 18 inches by 18 inches to assist with the mental projection of the colors to the walls. Additionally, the buyers may purchase small containers of about 2 ounces of the desired paints to paint larger swatches on the walls. Typically, the buyers start with small paint chips to narrow the choices and then move to larger paint chips and/or sample paints before choosing the final paint colors.

Color merchandising may take many forms including the electronic depictions discussed below. Color accurate, physical merchandise, which has a tactile dimension as well as color, is available in a nearly unlimited variety of shapes and sizes. These include the basic, single color chips described above, as well as strip chips, fan decks, designer decks, counter books, specialty collections and variations of all of these. The merchandising may be used by consumers or design professionals and may appear in retail stores, kiosks, design centers or be available for sale through stores or via the internet. All of this physical color merchandising is produced through an industrial process that requires quite large production runs to achieve economies of scale. Consequently, there are long lead times and relatively high inventory levels. Once produced, there is little flexibility to revise the form factor, by re-cutting and re-collating for instance. The color control of this physical merchandise is generally very good, including the control of metamerism which is managed by using pigment combinations that match as closely as possible the final product, in this case decorative paints. However, this type of merchandise cannot be immediately available, customized, or short run color merchandise. Onsite printing of color merchandise cannot adequately meet this need, because print technology has not been adequately accurate to meet the required quality standard. Specifically, the ability to produce non-metameric (or minimally metameric) color merchandise is not yet achievable.

When deciding on a paint color, customers typically select colors from the above-mentioned fan deck or use any type of inspiration piece to direct them to agreeable colors. To find the appropriate color chips, they must then search the store independently or ask a store staff member to find the color chips or wet samples. This process can be time consuming and frustrating. Many times, customers may search the store themselves for color chips and subsequently return the chips to the wrong location, hindering the paint selection process for future customers.

Another significant drawback of maintaining this merchandise, i.e., fan deck, paint chips large and small, 2-ounce wet paint samples, is inventory. Paint stores must keep a sufficient inventory of these merchandise and importantly sufficient amounts of items favored by customers. Lack of storage space can be an issue and the unavailability of merchandise in the colors that the customers want can cause inconvenience to the customers and loss of sales to the store. Furthermore, customized merchandise, such as multiple consumer selected colors displayed on a single sheet or consumer-selected colors being displayed with dwellings or buildings, cannot be produced on demand.

Recently, paint viewing or paint selection software, such as Benjamin Moore® Paints' Personal Color Viewer™ ("PCV") available either on the World Wide Web or as CD-ROM since at least 2003, has improved the paint selection process for buyers. The PCV software displays on a computer screen a number of standard interior rooms with furniture, e.g., living room, dining room, bedrooms kitchen and bathroom, as well as the exteriors of a dwelling. The buyers can change the colors of the room, including ceiling, trim and upper and lower walls, at will to project the colors to the entire room. Additionally, digital images of the buyers' own dwellings can be manipulated by the PCV software to display the desired colors.

One drawback of the paint selection software is that the images are typically displayed on computer screens, which are limited to combinations of three RGB primary colors (red, green and blue), or four CMYK primary colors (cyan, magenta, yellow and black) for common inkjet and laser printers. Only a limited number of colors can be displayed and viewed, when only three or four primary colors are used. Similarly, a fan deck can only display several thousands of colors, while more than ten thousand paint colors are available.

Another drawback of the paint selection software is that often a single color cannot be repeated from one computer screen to another computer screen, unless rigorous calibration procedures are conducted. One color often appears differently on different monitors. Even if a particular computer screen is properly calibrated and the limited color gamut can be displayed, the desired color cannot be printed because conventional inkjet printers do not have the capability to print colors accurately and to print colors that don't change under different illuminants or ambient/background lighting.

Paint selection software, printed merchandise and physical color chip fan decks cannot control the ambient light when paint colors are view ed by the consumers. It is known that colors can look different under different ambient illuminations, i.e., to a consumer, a particular color can look one way under one ambient light and look differently under a different ambient light. This phenomenon is known as "color inconstancy," when a single color is considered and "metamerism," when two or more colors are considered, discussed further below. Known ways to control color inconstancy and metamerism for color chips and fan decks include providing stringent quality control to their manufacturing process and to select combinations of color pigments and resins for use in the manufacturing of color chips and fan decks that are similar to combinations of color pigments and resins used in paints.

Color inconstancy is the change in color perception of a single physical color under different ambient lights or illuminants. Light sources are often identified by two important parameters: correlated color temperature (CCT) and spectral power distribution. The CCT is the temperature of the Planckian radiator (black body), whose perceived color most closely resembles that of the given light source at the same brightness and under specified viewing conditions. For example, some fluorescent daylight lamps have a CCT of 6500K. On the other hand, if the given light source has a chromaticity identical to a chromaticity point at the Planckian radiator locus on the CIE chromaticity diagram, that light source has the same Color Temperature (CT) in unit of Kelvin as that of the Planckian locus chromaticity point. For example, CIE Illuminant A has a CT of 2856K. The spectral power distribution, SPD, is a measure of the amount of energy emitted by the light source at each wavelength in the visible spectrum. This information is usually reported at 1, 2, 5, 10 or 20 nanometer intervals. For example, a color observed outdoors is illuminated by the sun with a wide range of CCT and SPD from sunrise to sunset. Indoor illumination or artificial light is rarely as bright as natural sunlight and differs considerably in SPD and may also differ in CCT. Illumination is an important factor in viewing colors, and the brightness of the environment, as well as the CCT and SPD, have a measurable effect on colors perceived by people. This effect explains why a consumer sometimes thinks that a sample paint color, such as the color of a paint chip, appears different at home (e.g., under incandescent light) than the way that paint color had appeared at a retail store (e.g., under fluorescent light). Some colors shift more than others under different light sources; colors that shift to a greater degree are said to have a higher degree of inconstancy.

Another drawback of paint chips, paint selection software, and other color selection tools is that they are subject to metamerism. Two or more colors may have the same color appearance under one ambient lighting condition, but may appear to be different colors under another ambient lighting condition. This is caused by the color pigment combinations of the paints being different from each other resulting in different spectral reflectance factors (SRF). Like SPD, SRF is a measure of the amount of energy reflected from a sample at the wavelengths of visible light. Typically these are reported at 1, 2, 5, 10 or 20 nanometer intervals. As an example, consider a green paint chip side-by-side with an actual green paint applied on a wall. Since this paint chip is made with certain pigment combinations and the paint is made with different pigments, their chemical and pigments compositions are different and would reflect light differently. Hence, while both may appear the same as the intended paint color or the paint color standard color under one illuminant, they may appear as different colors or non-matching colors, or different shades of the same color, under a different illuminant. More particularly, in natural daylight, both the paint chip and painted wall appear to be the same shade of green. However, when viewed under incandescent light, while the paint on the wall may still appear green, the paint chip color could appear as a different shade of green. Accordingly, consumers appreciate the need for paint selection tools that exhibit minimal metamerism in reference to colors or paints.

Inkjet printers use dye-based inks and pigment-based to print on papers. Dye-based inks can mix as they are being printed and are absorbed into the papers leaving very little ink on the surface of the papers. Dye-based inks can provide a large color gamut, but are susceptible to color fading. A number of inkjet manufacturers have produced pigment-based inks in order to address the color fading issue, and pigment-based inks are durable. Pigment-based inks comprise solid color pigments suspended in resin similar to architectural coatings and paints, and the solid color pigments, which can be organic and/or inorganic, are not absorbed into the papers, but are deposited on top of the papers and held to the papers by the resin.

Pigment-based and dye-based inks have different optical reflective properties depending on the wavelengths of the illuminating lights. In other words, these inks can reflect different illuminating lights differently. Hence, a combination of pigment-based inks or dye-based inks used to produce colors can reflect one illuminating light similarly, i.e., appear to be the same color, but reflect another illuminating light differently, i.e., appear to be different color.

Hence, there remains a need in the art for a system and apparatus for providing customers with color samples in the store setting while reducing inventory demands on the stores, simplifying the selection and to print accurate colors on demand that look substantially the same as the intended paint color or the paint color standard under different ambient light conditions.

SUMMARY OF THE INVENTION

The present invention provides an apparatus and methodology for creating color samples or color merchandise on-demand for customers at any location and provides the customers with color merchandise containing accurate, constant, low-metameric colors compared to the intended standard paint color or paint color standard.

The present invention provides a methodology that provides the customers and other decision makers the ability to make decisions, such as purchase decisions and other selections, based solely on non-verbal and non-textual, non-symbolic or non-hieroglyphic prints on a substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The patent or application file also contains drawings corresponding to Exhibits A-F, which are submitted in accordance with 37 C.F.R. §1.91(c) on the filing date of the present invention. Exhibits A-F form a part of the present specification.

In the accompanying drawings, which form a part of the specification and are to be read in conjunction therewith and in which like reference numerals are used to indicate like parts in the various views:

FIG. 1 is a perspective view of an inventive color selection station;

FIG. 2A is a color photograph depicting Exhibit A, which shows a small standard brown color paint chip placed on a large brown color paint chip printed by a conventional inkjet print process; FIG. 2B is a color photograph depicting Exhibit B, which shows a small standard brown color paint chip placed on a large brown color paint chip printed by a low metameric inkjet print process;

Figure 3:
Figure 4A:
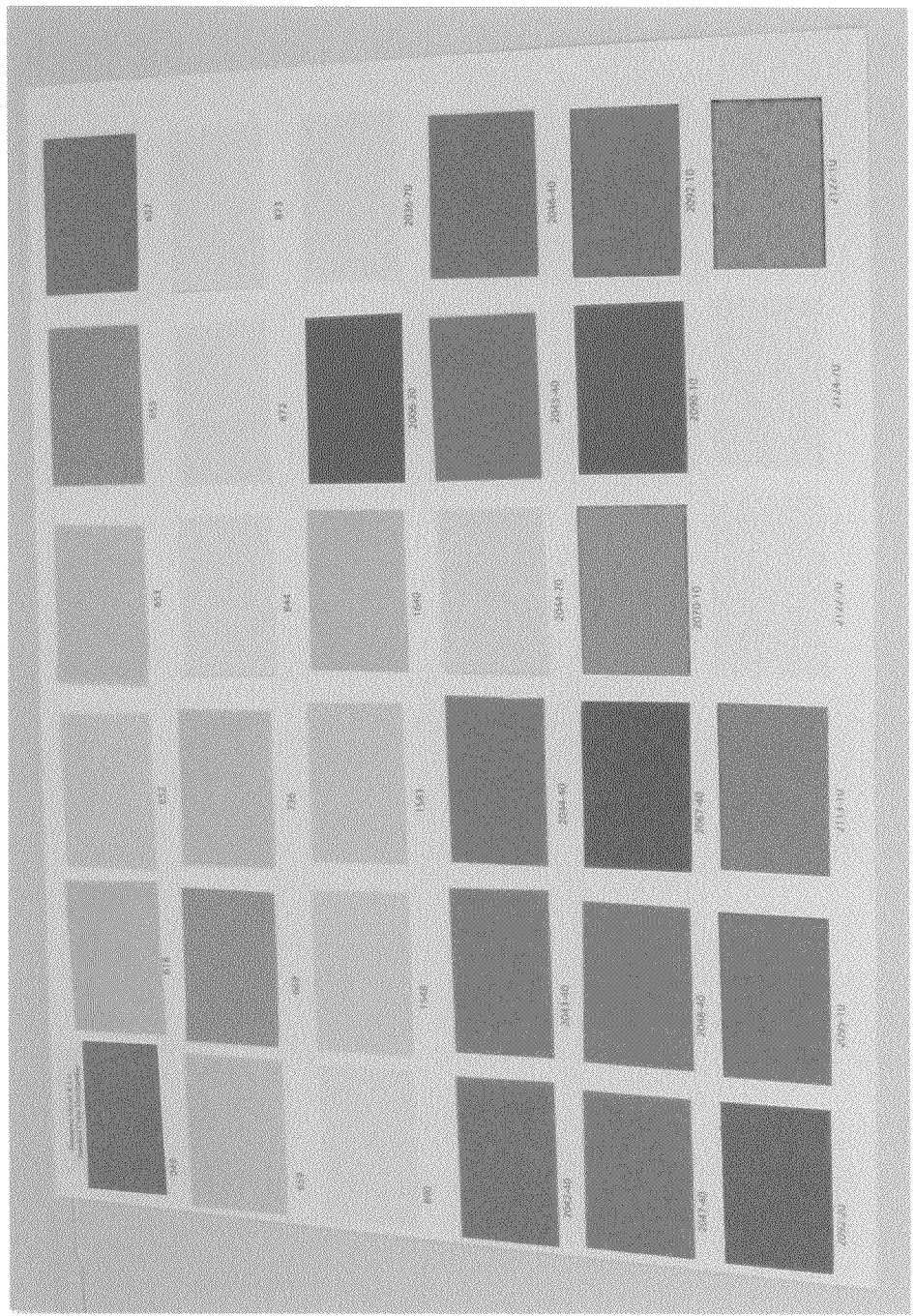
Figure 4B:
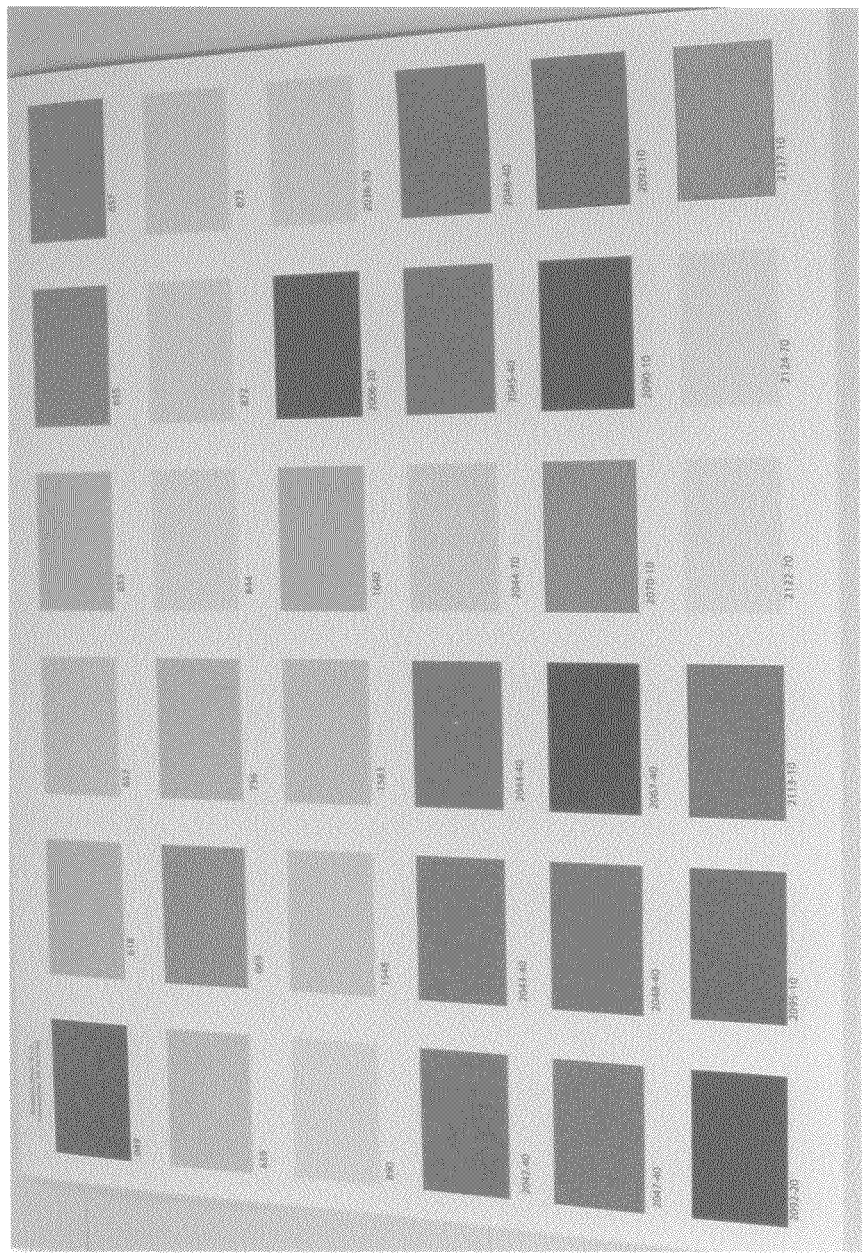
Figure 4C:
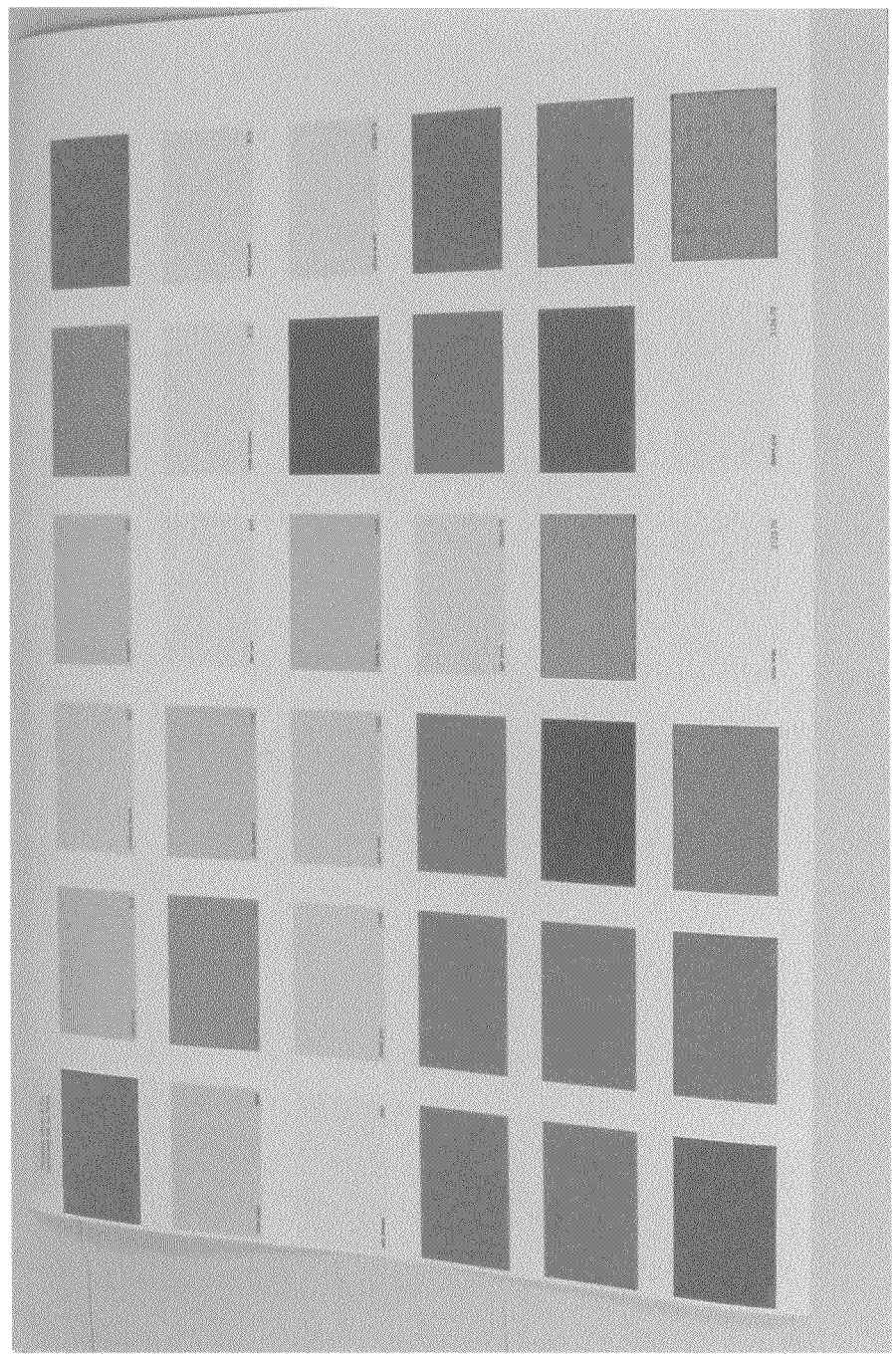

FIG. 3 is a color photograph depicting Exhibit C, which shows a series of standard color paint chips, a series of color paint chips printed by a conventional inkjet print process, and a series of color paint chips printed by a low metameric inkjet print process; and FIG. 4A is a color photograph depicting Exhibit D, which shows a series of standard color paint chips; FIG. 4B is a color photograph depicting Exhibit E, which shows a series of color paint chips printed by a conventional inkjet print process; FIG. 4C is a color photograph depicting Exhibit F, which shows a series of color paint chips printed by a low metameric inkjet print process.

Figure 5:
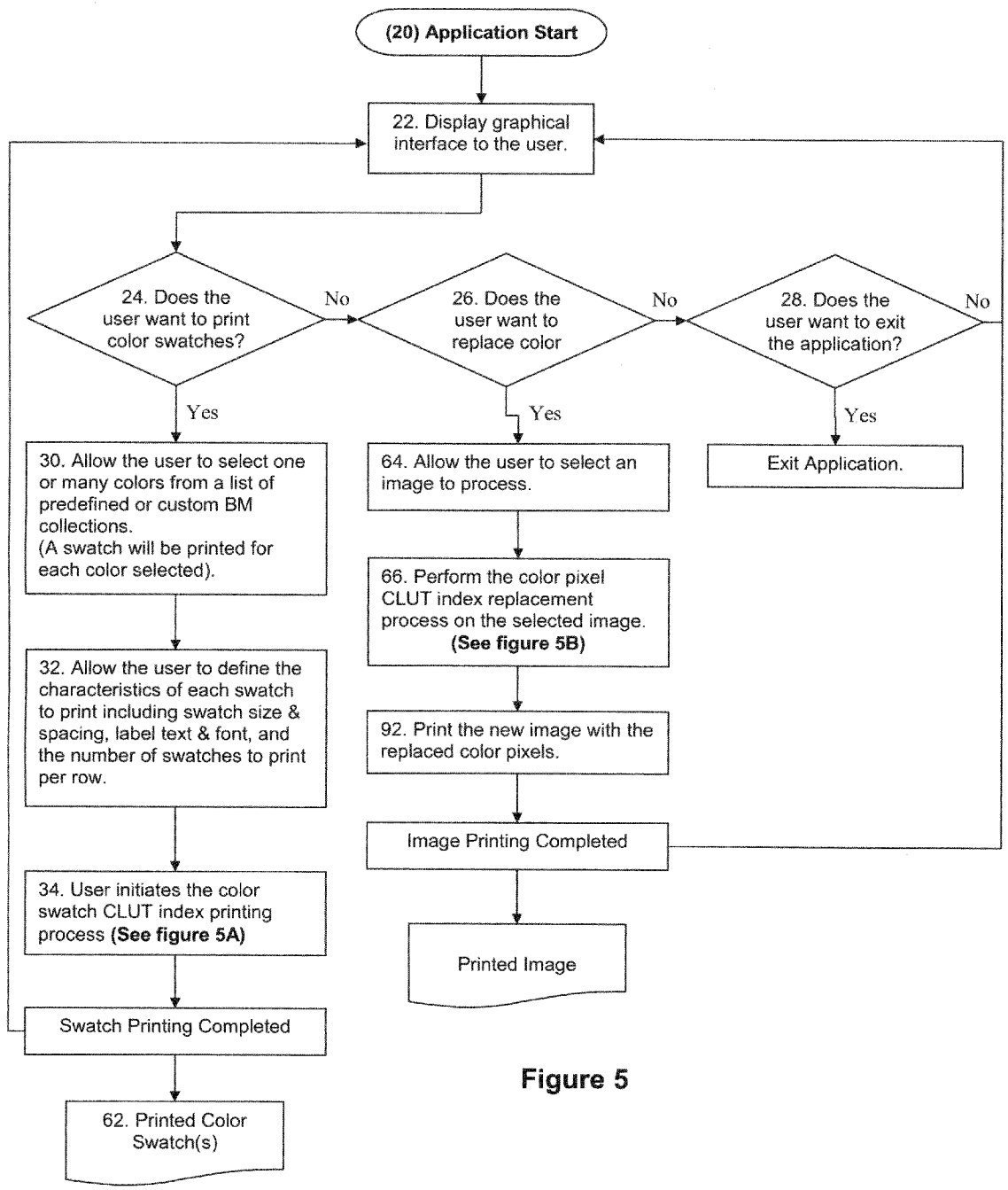
Figure 5A:
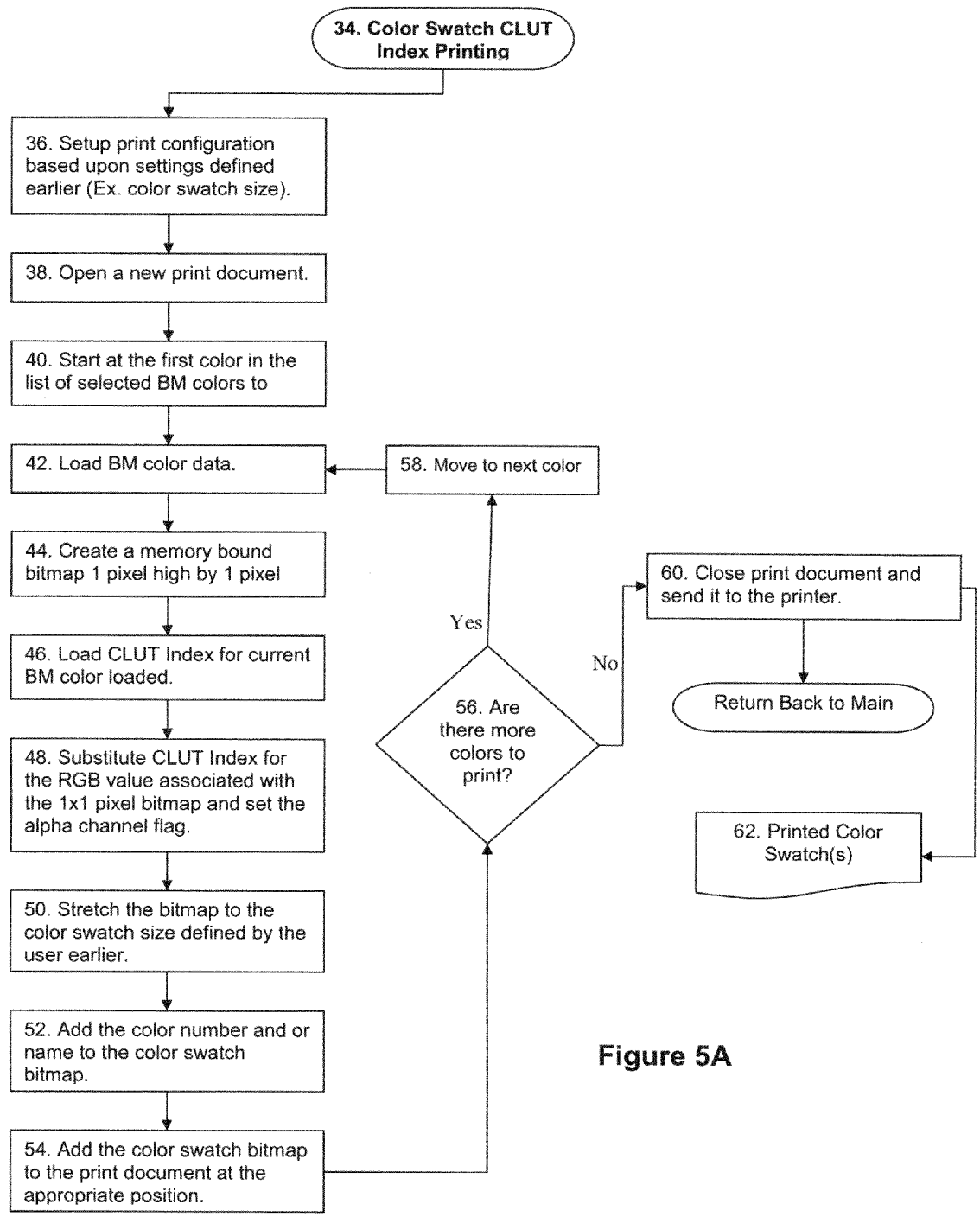
Figure 5B:
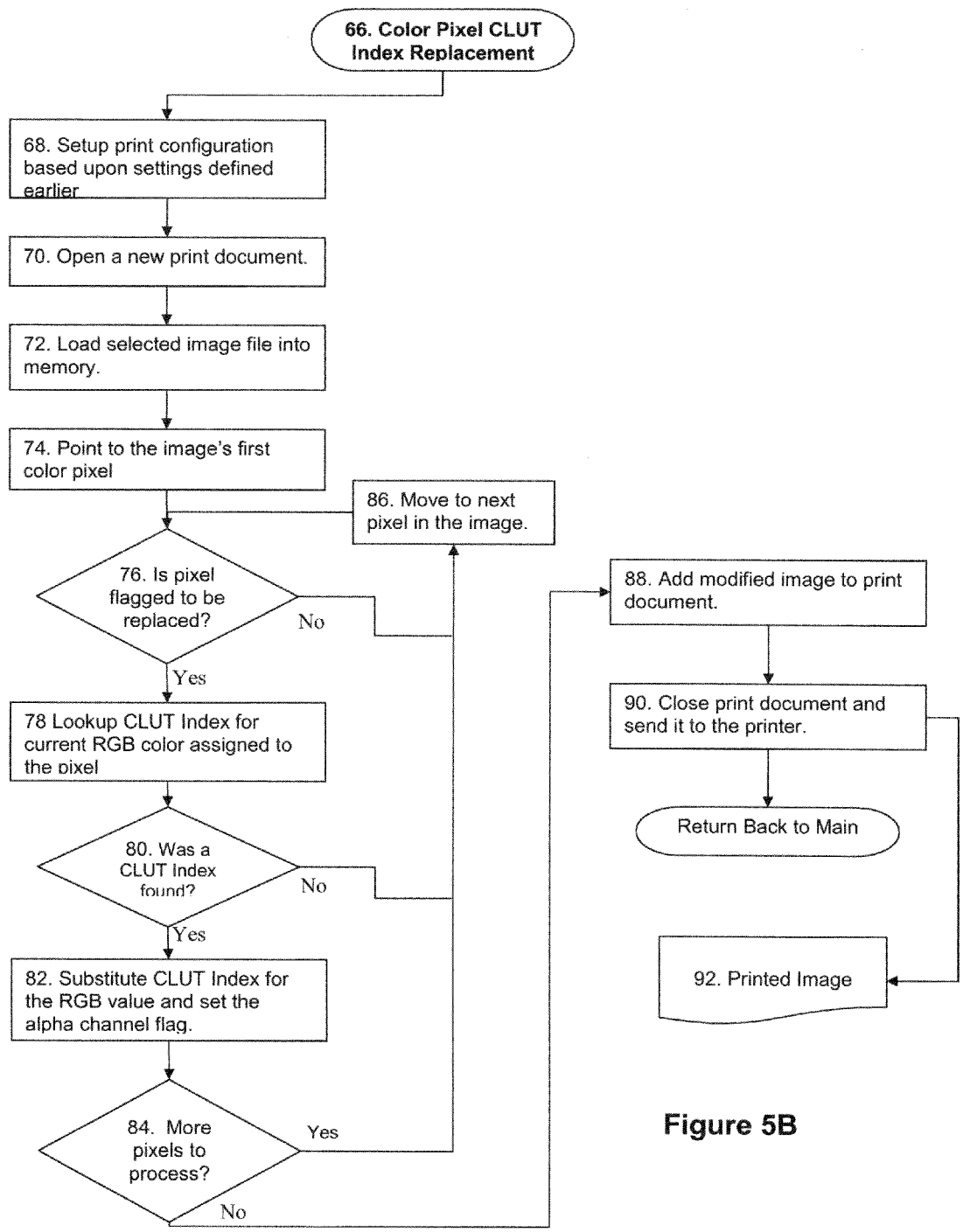

FIG. 5 is an exemplary flowchart showing an inventive interface/translation system; FIGS. 5A and 5B show the portions of the flowchart discussed in FIG. 5.

DETAILED DESCRIPTION OF THE PREFERRED EMBODIMENTS

The present invention provides an apparatus and methodology for creating color samples or color merchandise on-demand for customers at any location and provides the customers with color merchandise containing accurate, constant, low metameric colors compared to the intended standard paint color or standard color. The apparatus can be a color selection station 10, shown in FIG. 1, where consumers/customers may view and select colors from pre-manufactured merchandise, such as paint chips or customized color merchandise shown in FIGS. 2A-2B, 3 and 4A-4C and described below. Color selection station 10 can also prepare merchandise on demand from the consumers by printing the merchandise selected by the consumers.

As used herein, color merchandise or merchandise include but are not limited to strip chips with two or more colors on one strip and typically three, four or seven colors; fan decks which comprise a collection of strip chips; color cards which exhibit color samples, images, and suggested color combinations; large color samples typically about 12 inches by about 12 inches or larger; small color chips typically about 1 square inch up to 8 inches by 8 inches; layout boards that combine graphical imagery with color samples on a single panel; and collections of the previously listed items bound together in the form of books, fan decks, or pre-packaged materials.

A preferred printer is an inkjet printer that can print the many hundreds or thousands of paint colors accurately, constantly and with low metamerism compared to the intended standard paint color. Suitable inkjet printers include both pigment-based printers and dye-based printers that have the capability to print a color that appears substantially the same as the intended paint color or the paint color standard under multiple illuminants. Low metameric printing, and methodologies for judging and accepting the printed merchandise are discussed in detail in the commonly-owned, co-pending U.S. patent application entitled "Method for Managing Metamerism of Color Merchandise" filed on even date herewith and published as US 2010/0228511. This co-pending reference is incorporated herein by reference in its entirety, and represents a best mode of practicing the present invention.

The present invention also provides a methodology that provides the customers and other decision makers the ability to make decisions, such as purchase decisions and other selections, based solely on non-verbal and non-graphical prints without texts or symbols on a substrate. Up to now, information contained on papers or computer monitors or other substrates is processed by readers when it is in a written language, including modern and ancient languages, or in symbols, such as mathematical symbols. Never before have the readers been able to view a representation of a color printed on papers, i.e., non-verbal and non-textual without texts or symbols, with sufficient accuracy, constancy and low metamerism that the readers can make decisions, such as purchasing, rating or ranking, about that color without specialized standardized lighting without referring to another source.

The inventive apparatus and methods are discussed in detail below.

Figure 1:
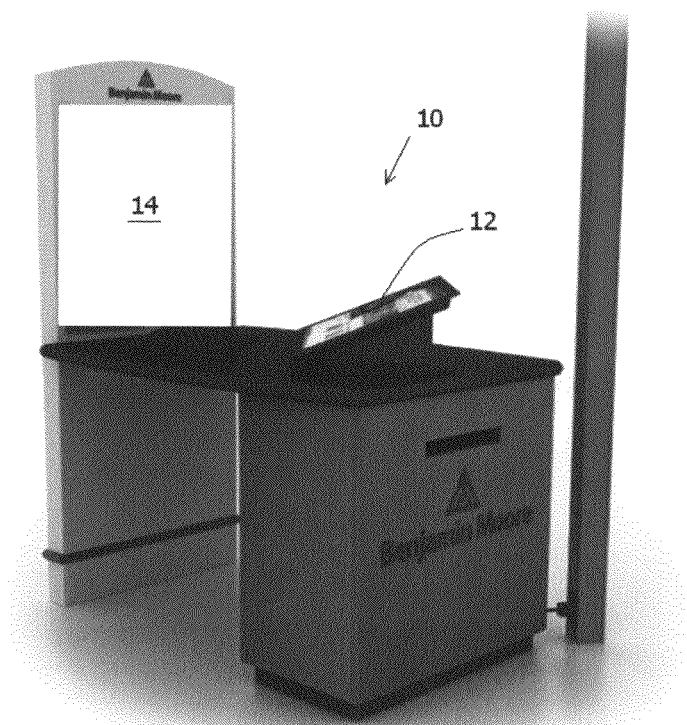

Referring to FIG. 1, color selection station (CSS) 10 is shown. CSS 10 comprises a number of components, including computer or television monitor 12, which can be a high resolution flat RGB screen. Monitor 12 is connected to a computer or central processing unit (CPU) positioned within the cabinetry of CSS 10. The computer is sized and dimensioned to run or operate one or more color selection software or color viewing software, such as the PCV® discussed above, or similar software. Other color selection software or color viewing software, such as the Wall of Inspiration, previously tested at Benjamin Moore's Janovic Store in New York, N.Y. and described in "The Wall of Inspiration: A Computer Aided Color Selection System," by S. Berrier, C. Shimizu, P. Chong, D. Colucci and G. Meyer (Jun. 10, 2008 version) available at www.paintselection.googlepages.com. Other suitable software include those described in commonly owned international patent application nos. PCT/US 08/69664 and PCT/US 08 69823, and other color selection patents and patent applications known in the patent literature. The present invention is operable with any color selection and color viewing software, and is not limited to any particular software.

The consumers would use the color selection/color viewing software to select one or more colors displayed on monitor 12. Monitor 12 can display colors with architectural objects, such as buildings and dwellings, with exterior and interior views. As discussed above, even when properly calibrated monitor 12 may not be able to properly produce the correct color due to the fact that monitors 12 are RGB monitors. In accordance with the present invention, CSS 10 may also have screen 14 that preferably uses five or more primary light sources, or multiple color LED primary light sources to mix/combine to produce a uniform and accurate color. Screen 14 is the display of a light mixing system disclosed in international published patent application no. WO 2006/076211, which is incorporated herein by reference in its entirety. This light-mixing system comprises a plurality of primary lights, which can be 5, 7 and up to 11 or more primary lights. Due to a higher number of primary lights, this light mixing system can display a wider color gamut than a conventional RGB monitor, as discussed in publication WO 2006/076211. The light mixing system has a system of fixed and movable baffles that thoroughly mix the primary lights into a diffused, uniform light, which is then displayed on screen 14. Screen 14 can display the same uniform color over a large area to allow consumers to view a large sample of the selected color. Textures can be added to screen 14 to represent the sheen of the paint, e.g., flat, eggshell, semi-gloss and gloss. Screen 14 can be any size to convey to the viewer how a color would look when painted on a large surface.

Light box screen 14 can be replaced by a three-dimensional light box, where the primary lights sources, including LEDs, halogens, incandescent and fluorescent lights are mixed in a light mixing chamber with a central baffle before being projected on to a flat or curve surface (similar to screen 14) located spaced apart from the mixing chamber. The flat or curve surface can also have texture to represent sheen. Such light box with the light mixing chamber is disclosed in commonly owned international patent application serial no. PCT/US08/088011 and filed on Dec. 22, 2008, which is incorporated herein by reference in its entirety. The light mixing chamber can include an ambient illuminant, such as day light, fluorescent light, incandescent light or a standard D50 light source mixed with the displayed light.

Consumers can repeatedly select more colors on monitor 12 and display more colors on screen 14 until final colors are selected and approved. Once the final colors are determined, corresponding color merchandise are selected or purchased. Up until the present time, there is no capability to produce color merchandise on demand, i.e., at the time of color selection. Generally, available color merchandise are limited to premade or pre-manufactured items such as color fan deck, strips of color chips, large chips, wet paint samples in limited colors. However, as described above, with many thousands of available colors, it is difficult to maintain sufficient inventories to satisfy consumer demands. Sufficient storefront space and storage space must be maintained to keep the color merchandise. Additionally, a manual or computerized inventory system is needed to maintain the inventory.

In accordance with one aspect of the present invention, at least a large portion and preferably all of the color chip merchandise can be replaced by a print-on-demand aspect of the present invention using accurate, constant and low metameric inkjet printers, discussed above. This inventive feature is illustrated in FIGS. 2A-2B, 3 and 4A-4C, discussed below. One conventional way of preparing color merchandise is to prepare a layout from a design template, or a custom design. Such templates may include an architect's rendition of a building or dwelling with a recommended color scheme. The completed template can be printed with conventional printing means. Thereafter, the architect or designer cuts color chips of the recommended color scheme and adheres them on the template so that the customers or clients can view the recommended colors accurately, since conventional printing means cannot print colors accurately. An example of this technique is shown in FIG. 4A. This methodology is time consuming, especially when the consumer or designer selects a large number of colors or the chosen colors span across multiple palettes or color libraries, as illustrated in FIG. 4A.

Suitable ink jet printers include, preferably, the Epson® Stylus Pro 7900 or 9900 (commercially available from Epson America, Inc., Long Beach, Calif.), the Hewlett-Packard Photosmart® Pro B9180 or Designjet® Z-2100 and Z-310 (commercially available from Hewlett-Packard Company of Palo Alto, Calif.), or the Canon imagePROGRAF® IPF5000 (commercially available from Canon U.S.A., Inc. of Lake Success, N.Y.).

Figure 2A:
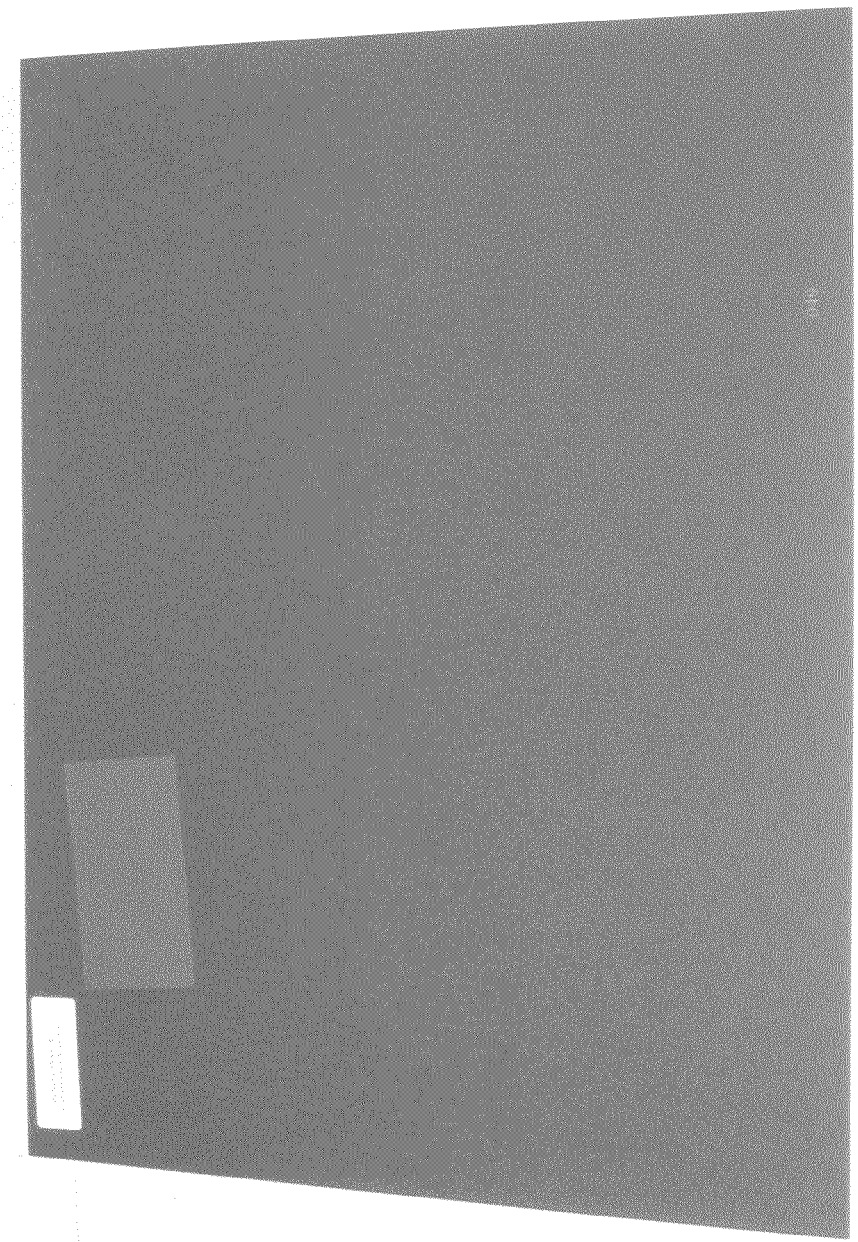

A less desired, conventional way of preparing color merchandise is to print the entire template with a conventional inkjet or laserjet printer. This is not desirable because the recommended colors cannot be represented adequately by conventional printing methods. Consumers cannot make any color judgments or decisions based on these incorrectly printed colors. Samples of color merchandise printed with conventional printing means are best shown in FIGS. 2A and 4B.

In one aspect of the present invention, CSS 10 utilizes an interface/translation system 20 that substitutes the color information from one or more color palettes, such as RGB, CMYK, CMYK+orange+green (CMYKOG), or any color systems/conventions or color space used to describe paint colors at an area or a pixel with an index value or location on a color lookup table (CLUT or LUT) that can be referenced by color printers. The color printers or more specifically their driver programs use the index value to locate on the CLUT the information and instructions necessary for the printer to produce the correct color at that area or pixel. In other words, interface system 20 translates or transforms the spectral information or colorimetric information associated with the multiple thousand paint colors in any color space to a CLUT index value that can be recognized by color printers.

Color lookup tables are commonly used to minimize the amount of memory space required to describe a color document that is sent to a color printer. Generally, a document is divided into pixels, i.e., a two dimensional table where each cell contains the color information of the corresponding pixel. However, for an 8-bit color RGB image, instead of having each pixel containing its own R, G, B values, which would require 24 bits, each pixel carries an 8-bit value index value that points to a location in the CLUT that contains the color information. See e.g., definition of "color lookup table" or "color palette" at The Free Dictionary at http://encyclopedia.thefreedictionary.com/color%20palette. See also, A. Balaji, et al. "Hierarchical Compression of Color Look Up Tables," 15$^{th}$ Color Imaging Conference Final Program and Proceedings, at pp. 261-266 (2007) and U.S. Pat. No. 5,483,360. These references are incorporated herein by reference in their entireties.

The CLUT table usable with interface system 20 also contains values related to the spectral information or colorimetric information associated with the multiple thousand paint colors and instructions to print with low metamerism. More specifically, the values in the CLUT table correspond to the R, G, and B colored ink values or C, M, Y and K colored ink values or C, M, Y, K, O and G colored ink values that can be recognized by color printers. The CLUT table values may also contain instructions to dispense precise amounts of the designated inks to achieve low metamerism.

A non-limiting, exemplary interface system 20 is shown in FIGS. 5 and 5A-B, and can be operated by CSS 10's CPU. The CPU may also run other programs or software, e.g., color selection software, at the same time or in background mode, described below. Interface system 20 interacts with the users by displaying a graphical user interface (GUI) shown at reference number 22. Interface system 20 provides the users at least three options: to print color swatches 24, to replace color pixels 26 or to exit 28. These options can be offered sequentially as shown in FIG. 5, or can be offered simultaneously.

If the users select to print color swatches 24, interface system 20 allows the users to select one or more colors from one or more color palettes, color libraries or color collections at step 30 using any of the color selection tools discussed above. For example, Benjamin Moore's (BM) color palettes or collections can be offered. The present invention is not limited to any particular color palettes or collections. In one example, one color swatch can be printed for each selected color. Next, the users can define the geometrical or dimensional characteristics of each swatch. All the swatches may have the same dimension and shape; however, interface system 20 has the ability to let the users define the dimensions and shape of each swatch. Identifying information for each color can also be selected to be printed with the colors at step 32. It is noted that this identifying information does not play a part in the users' color decision making process; it merely identifies the color name, color number or other information associated with the colors selected by the decision making process. The users would take the printed colors home or to other dwellings or structures where new paints would be applied. The users would then choose from the printed colors the paint colors that would be purchased and applied to the walls, ceilings, etc. This identifying information would assist with the purchasing process. Alternatively, the identifying information can be omitted and the selected colors can be identified by a spectrophotometer.

Then, the user may initiate the color swatch CLUT printing process at step 34, which is described in more detail in FIG. 5A. Color swatch CLUT printing process 34 comprises step 36 of setting up a print configuration using the earlier user-defined settings, step 38 of opening a new print document and step 40 of starting at the first selected color. For each color to be printed, the data for each color from the color palettes or color collections, e.g., BM color palettes, is loaded at step 42, a bitmap memory, for example, 1 pixel by 1 pixel, is created at step 44, and the CLUT index number for the current color from the color palettes or color collections, e.g., BM palettes, is loaded at step 46.

Thereafter, at step 48 the data for each color is replaced by the CLUT index number, and a flag is switched to the ON position to alert the printer's driver program that it needs to lookup in the CLUT for instructions to print with low metamerism for that pixel. The bitmap memory is then adjusted or stretched to the color swatch size earlier defined by the users at step 50. Step 50 may be omitted if in step 42, the bitmap memory is defined to be the color swatch size; however, all the pixels in the swatch's area would need to be processed. The color name and color number may be added to the bitmap memory at step 52. The color swatch bitmap is then added to the print document at the location selected earlier by the user at step 54. Steps 42-54 are repeated for each color selected to be printed as shown by decision point 56 and step 58. Thereafter, the print document is closed at step 60 and the print document is sent to the printer at step 62.

Referring to FIGS. 5 and 5B, at the color pixel CLUT index replacement step 26 the users can select a different color merchandise to print. The users can select a pre-existing image to process at step 64. The image can be one of the photographs or artworks professionally created and stored in the CPU. After the image is displayed, interface system 20 can perform the color pixel CLUT index replacement process on the selected image at step 66. For this process, at step 68 a print configuration is setup and a new print document is opened at step 70 to load the selected image into memory at step 72. Interface system 20 may prompt the users to point to the image's first color pixel or area at step 74 or may automatically point to the image's first color pixel or area. Next, a decision is made whether to replace the color pixel's color value (RGB, CMYK, CMYKOG color space values or the like) at step 76. If the decision is "yes", then interface system 20 looks up the CLUT index for the current color value assigned to the pixel at step 78. At step 80, if a matching CLUT value is not found, interface system 20 moves to the next color pixel, but if a matching CLUT value is found the matching CLUT value is substituted for the printer color value at step 82, and a flag is switched to the ON position, described above. At step 84, if there are more color pixels to process, then interface system 20 points to the next color pixel at step 86 and steps 76-82 are repeated. After all of the color pixels are processed, the modified image is added to the print document at step 88. The print document is then closed at step 90 and the image is printed at step 92.

One preferred application of color pixel CLUT index replacement step 26 is to allow the users to upload digital photographs or digitized photographs to the CPU to monitor 12. Such photographs can be pictures of the interior of rooms to be painted or the exterior of a dwelling of a building to be painted. Interface system 20 then allows the users to choose a certain surface to be painted, e.g., a wall, a window, a molding, etc., by a computer mouse or computer stylus, for example, at step 74. The chosen surface then can be colored by a BM color or a color from any palette or collection. This process is repeated until all the surfaces to be painted are colored on monitor 12. The modified photograph is then printed in accordance with the process described in FIG. 5A or 5B accurately and with low metamerism. The users can take printed photographs of their home, where the walls and ceilings are accurately painted with new paint colors and low metamerism. These photographs may also include the users' furniture, which can assist with the process of choosing new paint colors.

Figure 2B:
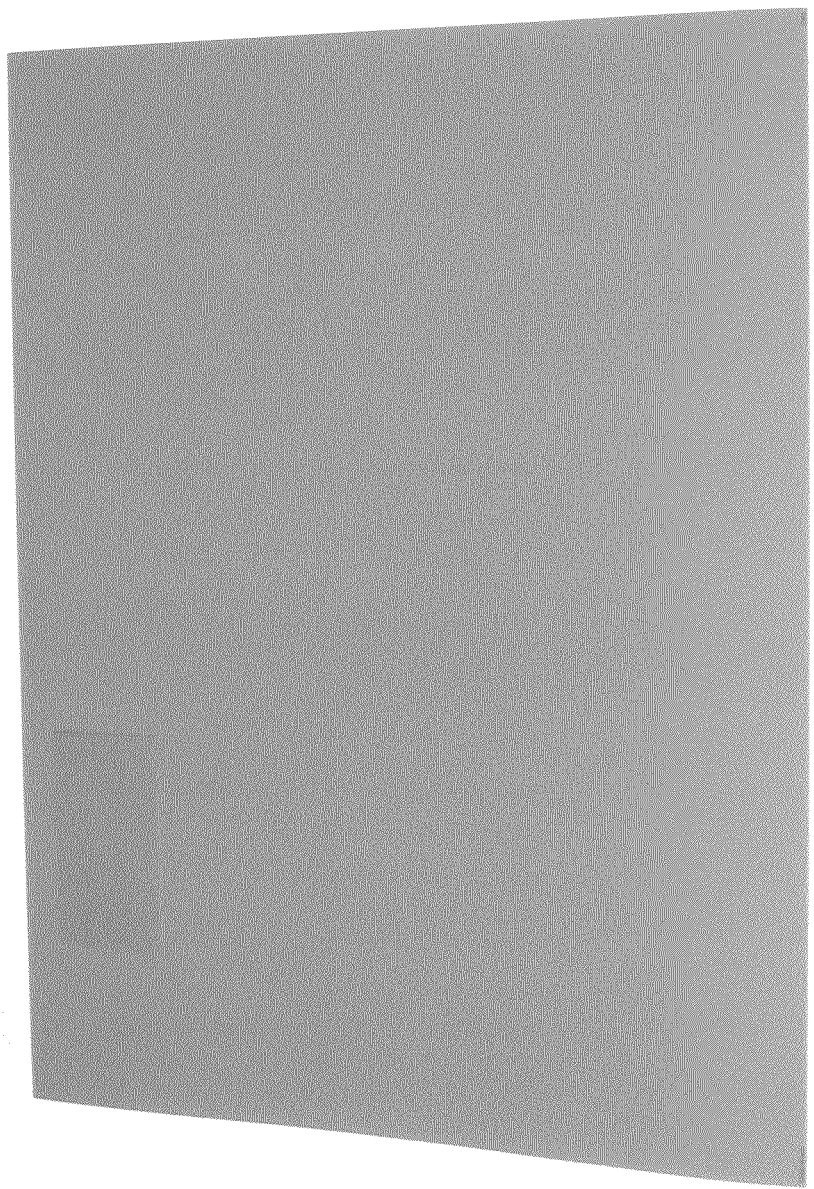

Referring to FIGS. 2A-2B, 3 and 4A-4C and Exhibits A-F, where the desirable results of the present invention are illustrated. FIG. 2A is a photograph of a large inkjet print (Exhibit A shows a specimen measured about 17 inches by 22 inches partially cut and folded) of a brown color in a convention manner, which has the designation of color number 049 and color name "Twilight Dreams" in the Benjamin Moore palettes. A smaller color chip standard is positioned on this large print to show how this color 049 should look. It can be clearly seen that the conventionally printed color does not resemble the color chip standard under a combination of daylight and fluorescent light sources, when the photograph was taken. All of the photographs in the present specification were taken under similar light sources. FIG. 2B is a photograph of a similar size inkjet print (Exhibit B shows a specimen measured about 17 inches by 22 inches partially cut and folded) of the same brown color in accordance with the present invention with a similar color chip standard positioned thereon at a similar location. Under the same light sources, the inventive inkjet print on demand and the color standard match.

FIG. 3 is a photograph of three color merchandise, namely strip chips, that should be showing the same colors under the same light sources. The middle strip chips are premade and represent the color standards. The strip chips on the left side are made in accordance to the present invention and the strip chips on the right side are made in a conventional manner. (See Exhibit C). It can be seen that the inventive strip chips match the standard strip chips under the same light sources, while the conventional strip chips do not.

When the color merchandise include many selected colors discussed above in connection with FIG. 4A (Exhibit D), it is very time consuming to cut and paste a large number of color chips which represent the color standards on to a substrate. FIG. 4B is a photograph of the same color merchandise produced in a conventional manner (Exhibit E), and FIG. 4C is a photograph of the same color merchandise produced in accordance with the present invention (Exhibit F). It can be seen that the inventive color merchandise match the color standard under the light sources, while the conventional color merchandise don't. (Exhibits D, E and F show specimen measured about 17 inches by 22 inches partially cut and folded)

CSS 10 can print color chips of any convenient size and can print a sample up to 48 inches wide. After a color merchandise is prepared and dried, the consumer may hold it up against screen 14 to double check whether the color(s) of the merchandise matches the displayed color(s) on screen 14. Alternatively, CSS 10 can be optionally enclosed and can be equipped with various ambient illuminants so that the color merchandise can be checked for color constancy and color metamerism before the consumer leaves CSS 10 to try the color merchandise at home. In one example, CSS 10 can be illuminated with various light sources, including but not limited to daylight, natural light, incandescent and halogen lighting. Suitable such light sources are available as the Benjamin Moore Retail Lighting System from Benjamin Moore & Co. of Montvale and Flanders, N.J.

Another advantage of the present invention is that the inventory of dried color chips is greatly reduced and preferably eliminated. Dried color chip inventory is replaced by an inventory of primary inks, which can be as low as four primaries. The reduced inventory requirement allows paint manufacturers to reduce the size of CSS 10 and to deploy CSS 10 as kiosks in paint stores, shopping malls, airports, parking lots and building supply stores. The inks are transformed by the present invention into accurate, constant, low metameric colors and color merchandise to reduce inventory of premade or pre-manufactured color merchandise.

Commonly owned patent application "Method for Managing Metamerism of Color Merchandise" filed on even date herewith, describes a method for managing metamerism for a set of color standards, which closely represents actual paint colors, and color merchandise. This application is incorporated herein by reference in its entirety. Initially, one measures the spectral reflectance factor (SRF) of each color standard (this may be actual paint or a good representation thereof such as a carefully produced nitrocellulose lacquer) using a color measurement device such as a spectrophotometer. Subsequently, one selects a set or combination of ink compositions corresponding to the spectral reflectance factor of each color standard. These ink compositions are then used with an inkjet printer to produce a set of color merchandise (e.g., paint chips) using non-fluorescent inks on a media free of optical brighteners.

Next, one measures the spectral reflectance factor of the color merchandise. Subsequently, one evaluates the degree of metamerism for the set of color standards and color merchandise pairs by means of either, or preferably both, an instrumental test having a first acceptance criterion and/or a visual test having a second acceptance criterion. If a given color standard-color merchandise pair has an unacceptable degree of metamerism, the ink composition used to produce the color merchandise is re-selected until an acceptable degree of metamerism is achieved or until one reaches the conclusion that an improved match is not possible with the materials available either due to gamut limitations or colorimetric properties. After evaluating the degree of metamerism for each color standard-color merchandise pair, one ascertains $p_{ins}$ and/or $p_{vis}$, wherein $p_{ins}$ represents the percentage of color standard-color merchandise pairs that pass the instrumental test and $p_{vis}$ represents the percentage of color standard-color merchandise pairs that pass the visual test. If the value of $p_{ins}$ and/or $p_{vis}$ is below an optimal value or if $p_{ins}$ and $p_{vis}$ do not correlate well, then one modifies the first acceptance criterion, the second acceptance criterion, or both criteria until a balance is achieved between the acceptance criteria values and $p_{ins}$ and $p_{vis}$.

More specifically, an instrumental test, a visual test, or both are used to evaluate the acceptability of color match between a set of plural color standards and inkjet printed color merchandise under a plurality of illuminants. Instrumental tests utilize a CPU, color measurement device or like computational instrument to calculate the value of one or more mathematical expressions suitable for evaluating the degree of color difference and metamerism. Visual tests utilize a panel of observers (e.g., three or more observers) to ascertain the effects of metamerism. Either the instrumental or visual tests can be singly used to assess the acceptability of a color match. Advantageously, however, the combination of both the instrumental and visual means provide a greater degree of confidence that assessment of metamerism is accurate and that an acceptable level of tolerance has been established. The number ($n_{total}$) of total color standard and color merchandise pairs, which are evaluated by both instrumental and visual means, can be in an order of magnitude equivalent to about $10^1$, preferably about $10^2$, more preferably about $10^3$, e.g., about 30, or about 300, or about 3000 color standard-color merchandise pairs. The illuminants can be a balanced illuminant, CIE Illuminants D65, CWF/F2 and A, and optionally F11. The balanced illuminant comprises a plurality of illuminants having different CCTs and the balanced illuminant has an effective CCT between about 4200 K and 4600 K, and more preferably CCT between about 4300 K and 4500 K.

Standard illuminants with a defined spectral power distribution have been recommended by the CIE and adopted by many industries. For instance, the CIE D illuminants (D50, D55, D65 and D75) represent different phases of "average" daylight, with respective correlated color temperatures of 5000, 5500, 6504 and 7500 K. The illuminant D65, representing average noon daylight, is a commonly-used standard illuminant and can be used in the present invention to assess color difference values. Other suitable illuminants include, without limitation, CIE Illuminant A, CIE Illuminant CWF ("Cool White Fluorescent")/F2, and CIE Illuminant F11. CIE Illuminant A (CCT 2856 K) represents incandescent light sources such as household tungsten filament lamps. CIE Illuminant CWF/F2 (CCT 4100 K) represents cool white fluorescent light sources. CIE Illuminant F11 (CCT 4000 K) represents TL84, narrow band tri-phosphorous fluorescent light sources.

Instrumental means utilize one or more mathematical expressions including those described in a paper by F. H. Imai, M. R. Rosen, and R. S. Berns, entitled "Comparative Study of Metrics for Spectral Match Quality," Proc. CGIV 2002: The First European Conference on Colour in Graphics, Image and Vision, 492-496 (2002). This paper is incorporated herein by reference in its entirety. The Imai et al. paper discloses that CIE color difference equations, spectral curve difference equations (e.g., root mean square equations), metamerism indices, and weighted root mean square equations are all suitable for evaluating the degree of metamerism.

In a preferred aspect of the present invention, instrumental means utilize CIE color difference equations to ascertain the effects of metamerism. Color difference ($\Delta E$) is defined as the distance between two colors in a color space such as CIELAB. The value of $\Delta E$ is calculated using a color difference formula, such as, preferably the CIEDE2000 color difference formula for a 10° standard observer. The CIEDE2000 color difference formula is set forth in G. Sharma, W. Wu, and E. Dalal, "The CIEDE2000 Color-Difference Formula: Implementation Notes, Supplementary Test Data, and Mathematical Observations," Color Res. Appl. 30: pp. 21-30, February 2005, which is incorporated herein by reference in its entirety. As noted in the Sharma paper, CIEDE2000 color difference values are calculated by a methodology that transforms measured CIELAB values into CIE L*C*h (lightness, chroma, hue) color space values. The CIEDE2000 color difference equation comprises weighting factors $k_L$, $k_C$, and $k_H$ for the metric lightness difference, metric chroma difference and the metric hue difference, which in the present invention are 1, 1, 1, respectively. Other suitable color difference equations include the CIELUV, CIELAB and the CIE94 color difference equations.

Because CIE color difference equations rely on color space values, which are a function of illuminant spectra distribution), one can calculate $\Delta E$ for the same plural illuminants used in step 40 above, i.e., at least three, preferably at least four, more preferably at least five illuminants. By evaluating the color standard and color merchandise under a broad spectrum of lighting conditions, one can take steps to minimize the effects of metamerism, i.e., the possibility that color standard and color merchandise will appear different under different light conditions.

For each color standard-color merchandise pair, one should tabulate a matrix of color difference values under the various illuminants, and note therein the minimum, maximum, and average $\Delta E$. For a given color standard and a given color merchandise, the average $\Delta E$ (CIEDE2000) value should be less than about 1.0, preferably less than about 0.7, and more preferably less than about 0.4. Similarly, the maximum $DE_{2000}$ value should be less than about 1.5, preferably less than about 1.4, and more preferably less than about 1.0.

Visual means can also be used to assess the color difference for the total number ($n_{total}$) of color standard-color merchandise pairs under at least three, more preferably at least four, and most preferably at least five illuminant simulators. The visual assessment may be conducted in any suitably controlled manner. In one exemplary manner, color standards are comprised on a set of mid-grey card masks (e.g., 17"×22") that are layered over color merchandise prints. The masks have semi-circular holes in the card that allow equal areas of color standard and color merchandise to be visible. The layered sets of masks and prints should be observed under light sources that emulate illuminants such as Balanced Illuminant, CIE Illuminant D65, CIE Illuminant A, CIE Illuminant CWF/F2, and optionally F11. Such simulators are commercially available as light booths, e.g., the Benjamin Moore Retail Lighting System, commercially available from Benjamin Moore & Co. of Montvale, N.J.; or the GLE-M® color matching luminaries series, commercially available from GTI Graphic Technology, Inc. of Newburgh, N.Y.; or the Judge II-S® viewing booth from X-Rite, Inc. of Grand Rapids, Mich. The layered sets of masks and prints are observed by a panel comprising individuals, who have normal color vision and are trained in color discrimination. The panel comprises three, preferably five, more preferably seven individuals.

Panelists may make perceptibility and/or acceptability judgments. Perceptibility judgments simply require a panelist to determine whether or not there is any visual color difference between the standard and merchandise, whereas acceptability judgments require panelists to determine whether the visual color difference is acceptable. In a preferred aspect of this invention, each panelist makes an acceptability judgment. The panelist decides if (i) there is no visual color difference and the color standard-color merchandise are an acceptable match (a "pass" judgment), or (ii) there is a small visual color difference but the color standard-color merchandise are still an acceptable match (a "marginal pass" judgment), or (iii) there is a visual color difference that is unacceptable (a "fail" judgment). Thus, for each color sample-color standard pair there are 4 or 5 determinations corresponding to the number of light sources specified. Each panelist may make independent determinations which are later reconciled or the panel may work as a group to make a consensus determination for each observation. Once all observations have been made, those color sample-color standard pairs that "pass" under all 4 or 5 light sources are deemed to be acceptable colors. The percentage acceptable colors varies for four light sources (e.g., about 85%, preferably about 90%, more preferably about 95% pass/marginal judgments) and five light sources (e.g., about 50%, preferably about 55%, more preferably about 60% pass/marginal judgments).

In one aspect of the invention, the number of light sources is much less important than the actual selected light sources utilized. In other words, the spectral quality of the selected light source(s) will impact on the percentage acceptable colors. For example, the use of F11 will affect the percentage acceptable colors much more than the use of F2. In general, a light source with a very jagged SPD plus radiance at limited narrow band wavelengths, such as F11, will render color matching more challenging. An inverse relationship has been observed between the acceptance criteria and the percentage of acceptable colors. Acceptable colors are defined as those for which the color sample and the color standard meet acceptability criteria under all illuminants or light sources. As one lowers the acceptable average and maximum ΔE values, there is a lower percentage ($p_{ins}$) of color standard—color merchandise pairs that pass such more stringent instrumental acceptance criteria. Similarly, as tighter visual tolerance criteria are implemented there is a smaller percentage ($p_{vis}$) of color standard—color merchandise pairs that pass visual acceptance criteria. Accordingly, the acceptance criteria for both instrumental and visual assessments should be correlated so as to optimize the values of $p_{ins}$ and $p_{vis}$. The value of $p_{ins}$ is given by the expression $p_{ins}=n_{ins}/n_{total}$ and the value of $p_{vis}$ is given by the expression $p_{vis}=n_{vis}/n_{total}$, wherein $n_{ins}$ and $n_{vis}$ are the number of color standard—color merchandise pairs that respectively pass instrumental and visual assessments. A balance is preferably achieved to insure that the colors that pass the acceptability requirements meet the customer's needs and expectations but to also insure that a sufficient number of acceptable colors is available to provide a suitable range of color samples. If the acceptance criteria are too tight then there will be too few acceptable colors, if the acceptance criteria are too loose then the colors may be unacceptably metameric.

Only one of the instrument test or visual test is needed. In one preferred embodiment, both the instrument and visual tests are used.

As discussed in commonly owned patent application "Method for Managing Metamerism of Color Merchandise," the combination of ink compositions selected to correspond to the spectral reflectance factor of each color standard can be based on the spectral reflectance factor of each ink in the combination.

In accordance with another aspect of the present invention, the color merchandise represents non-textual printing with no symbols that is sufficiently accurate in its representation of colors that the viewers/decision makers are capable of making a decision, a selection of whether a color or colors are acceptable, without the necessity of edification or explanation by texts or symbols. An example of this color merchandise is shown in FIG. 3. Until now, whenever a printer produces a color, that printed color is too inaccurate to represent the true color. The viewer must refer to pre-manufactured color merchandise, such as color chips of varying sizes or wet paint samples for a representation of true colors. While the printer can produce texts that convey information sufficient for the reader to make a decision, it cannot produce non-textual, non-symbolic, non hieroglyphic prints that a viewer can rely on. The low metameric, color constant printer system discussed above provides accurate printed colors that accurately represent true colors under various illuminants.

In accordance with another aspect of the present invention the printer can be replaced with other color merchandise, such as wet paint samples, conventional color paint chips stored within a vending-type machine, which would need to be serviced and have its inventory maintained. Depending on its location, the vending machine may take on a number of forms. Generally, the device consists of a user interface portion having a navigation screen, an enclosed storage portion housing color samples, a dispensing mechanism, and optionally a display surface to allow customers to view colors on a large swath of surface, similar to screen 14, under one or more ambient light conditions.

The user interface portion of the vending device may comprise a computer screen with a mouse and keyboard apparatus for navigation purposes. It may also comprise a touch-sensitive screen for navigation purposes. Alternatively, the user interface portion may be purely mechanical. The user interface can be computer screen 12 controlled by its CPU, as discussed above, and the color selection process can be any one of the color selection or color viewing software discussed above.

In another embodiment of the present invention, the user may select a desired paint color, as discussed above, and obtain a sample of the paint. In accordance with this embodiment, CSS 10 comprises a storage portion having premixed paint precursors and a variety of pigments covering the range of paint colors available for selection by the user. The paint sample may be formulated by CSS 10 by combining a number of the paint precursors and the appropriate pigment and dispensed in wet form. Alternatively, the paint sample may be formulated by the vending device by combining a number of the paint precursors and the appropriate pigment and subsequently applying the paint sample to a surface, such as cardstock or a material approximating a wall. The painted surface may then be cured or dried before it is dispensed to the customer. U.S. Pat. No. 6,221,145 teaches premixed paint components that may be stored at a point-of-sale location and combined to create any number of paints having different finishes, i.e., flat, matte, satin, eggshell, semi-gloss and high-gloss, and any number of hues.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A color selection apparatus comprising:
a central processing unit,
a monitor connected to the central processing unit displaying at least one color, wherein the at least one displayed color corresponds to a physical color merchandise standard,
an interface system executed by the central processing unit to transform spectral or colorimetric information of a color contained in a digital printer that corresponds to the at least one color displayed on the monitor to a color lookup table index value, and
wherein the printer is connected to the central processing unit to print said color as at least one color merchandise using the color lookup table index value, wherein the printed color merchandise is substantially similar to the corresponding physical color merchandise standard, such that an average measured color difference ($\Delta E$) for a 10° standard observer between the printed colors and their corresponding color standards is less than 1.0 CIEDE2000 unit for at least two ambient illuminants,
wherein the color selection apparatus is capable of changing a shape or a dimension of the printed color merchandise, and
wherein a user is capable of checking for color constancy or metamerism of the printed color merchandise prior to leaving the color selection apparatus.

2. The color selection apparatus of claim 1, wherein a majority of a panel of three or more observers rates that the printed color merchandise and the corresponding physical color merchandise standards are acceptable match under said ambient illuminants.

3. The color selection apparatus of claim 1, wherein the average $\Delta E$ is less than 0.7 CIEDE2000 unit.

4. The color selection apparatus of claim 1, wherein the average $\Delta E$ is less than 0.4 CIEDE2000 unit.

5. The color selection apparatus of claim 1, wherein a maximum $\Delta E$ for a 10° standard observer between the printed color and the color standard is less than 1.5 CIEDE2000 units for said ambient illuminants.

6. The color selection apparatus of claim 5, wherein a maximum $\Delta E$ for a 10° standard observer between the printed color and the color standard is less than 1.4 CIEDE2000 units.

7. The color selection apparatus of claim 6, wherein a maximum $\Delta E$ for a 10° standard observer between the printed color and the color standard is less than 1.0 CIEDE2000 units.

8. The color selection apparatus of claim 1, wherein said illuminants comprises at least three ambient illuminants.

9. The color selection apparatus of claim 8, wherein said illuminants comprises at least four ambient illuminants.

10. The color selection apparatus of claim 9, wherein said illuminants comprises at least five ambient illuminants.

11. The color selection apparatus of claim 1, wherein one of said illuminants is a balanced illuminant with an effective CCT between 4200° K and 4600° K comprising a plurality of illuminants having different correlated color temperatures (CCT).

12. The color selection apparatus of claim 11, wherein said effective CCT between 4300° K and 4500° K.

13. The color selection apparatus of claim 1, wherein the printer uses a plurality of pigment based inks to produce the printed colors.

14. The color selection apparatus of claim 1, wherein the physical color merchandise standards comprise paint colors or paint chips.

15. A method for producing low metameric color merchandise comprising the steps of
a. selecting one or more physical color merchandise standards,
b. providing a digital printer that uses a plurality of inks,
c. substituting spectral or colorimetric information contained in the printer associated with the one or more physical color merchandise standards to one or more corresponding color lookup table index values, wherein the printer uses the one or more color lookup table index values to print one or more color merchandise,
d. printing on a substrate said color merchandise, wherein the one or more printed color merchandise are substantially similar to the corresponding one or more physical color merchandise standards, such that an average measured color difference ($\Delta E$) for a 10° standard observer between the one or more printed color merchandise and their one or more corresponding physical color merchandise standards is less than 1.0 CIEDE2000 unit for at least two ambient illuminants,
wherein a shape or a dimension of the one or more printed color merchandise is capable of being changed, and
wherein a user is capable of checking for color constancy or metamerism of the one or more printed color merchandise immediately after said color merchandise is printed.

16. The method of claim 15, wherein a majority of a panel of three or more observers rates that the printed color merchandise and the corresponding physical color merchandise standards are acceptable match under said ambient illuminants.

17. The method of claim 15, wherein the average $\Delta E$ is less 0.7 CIEDE2000 unit.

18. The method of claim 16, wherein the average $\Delta E$ is less than 0.4 CIEDE2000 unit.

19. The method of claim 15, wherein a maximum $\Delta E$ for a 10° standard observer between the printed color and the color standard is less than 1.5 CIEDE2000 units for said ambient illuminants.

20. The method of claim 15, wherein said illuminants comprises at least three ambient illuminants.

21. The method of claim 20, wherein said illuminants comprises at least four ambient illuminants.

22. The method of claim 15, wherein the inks comprise pigment based inks.

23. The method of claim 15, wherein the physical color merchandise standards comprise paint colors or paint chips.

24. The method of claim 15 further comprising the step of displaying the selected colors.

25. The method of claim 15, wherein the color merchandise is selected from a group consisting of strip chips with two or more colors on one strip; strip chips with up to seven colors;

fan decks which comprise a collection of strip chips; color cards which exhibit color samples, images, and suggested color combinations; large color samples having dimensions of about 12 inches by about 12 inches or larger; small color chips having dimensions from about 1 inch by 1 inch to about 8 inches by 8 inches; layout boards that combine graphical imagery with color samples on a single panel; and combinations and sub-combinations thereof loose or bound in the form of books, fan decks, or pre-packaged materials.

26. The method of claim 15 further comprising the step of providing a color selection tool.

27. The method of claim 16 wherein at least about 85% of the observers rate that the printed colors and the corresponding color standards are acceptable match under four ambient illuminants.

28. The method of claim 16 wherein more than about 50% of the observers rate that the printed colors and the corresponding color standards are acceptable match under five ambient illuminants.

29. The method of claim 15, wherein one of said illuminants is a balanced illuminant with an effective CCT between 4200° K and 4600° K comprising a plurality of illuminants having different correlated color temperatures (CCT).

30. The method of claim 15 further comprising after step (c) the step of setting a flag to ON to alert a driver program of the printer to look up instructions to print with low metamerism.

31. The color selection apparatus of claim 1, wherein the color merchandise is selected from a group consisting of strip chips with two or more colors on one strip; strip chips with up to seven colors; fan decks which comprise a collection of strip chips; color cards which exhibit color samples, images, and suggested color combinations; large color samples having dimensions of about 12 inches by about 12 inches or larger; small color chips having dimensions from about 1 inch by 1 inch to about 8 inches by 8 inches; layout boards that combine graphical imagery with color samples on a single panel; and combinations and sub-combinations thereof loose or bound in the form of books, fan decks, or pre-packaged materials.

* * * * *